No. 816,589. PATENTED APR. 3, 1906.
J. MOREHEAD.
GOVERNOR FOR STEAM SYSTEMS AND METER THEREFOR.
APPLICATION FILED MAY 26, 1905.
3 SHEETS—SHEET 1.
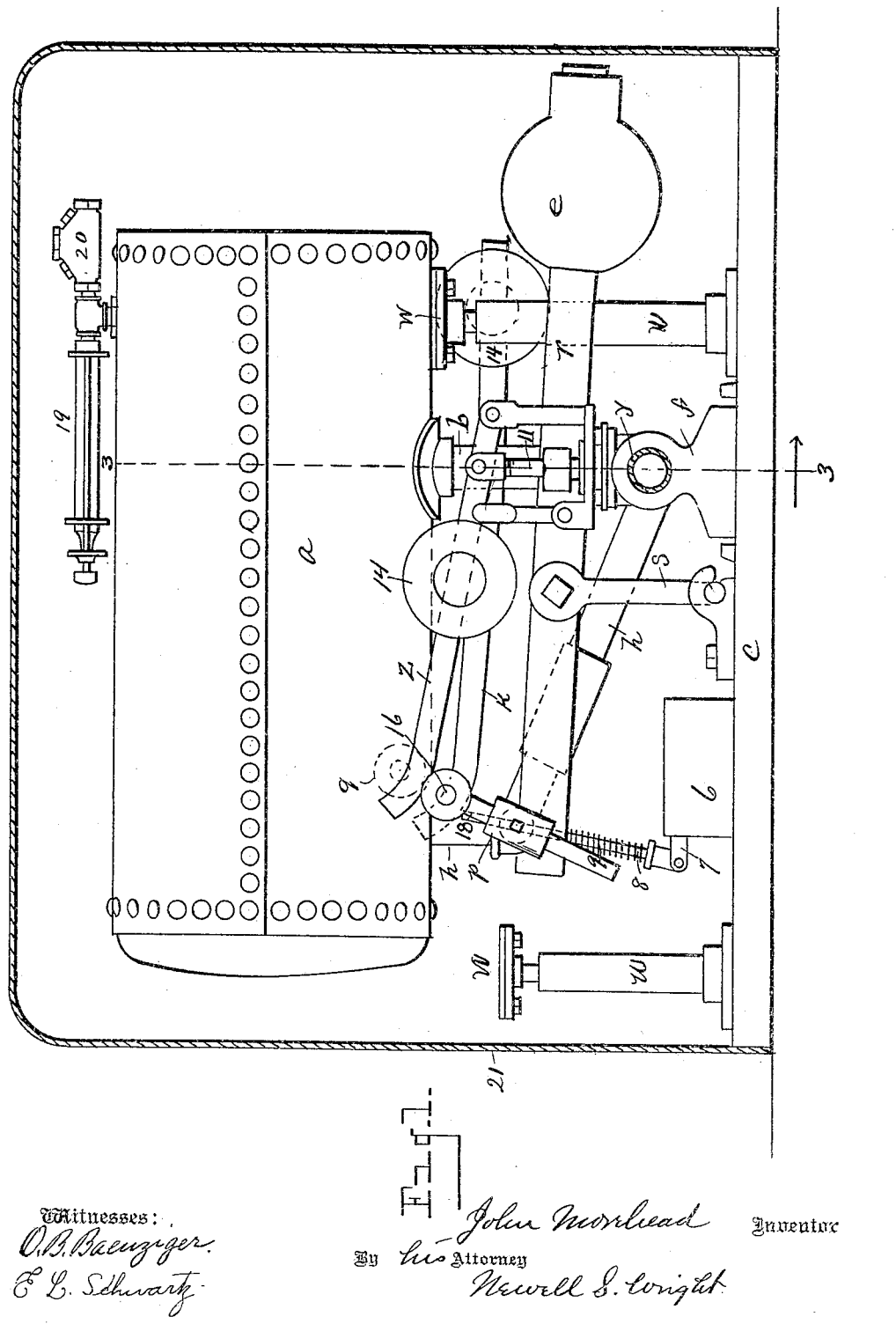

No. 816,589. PATENTED APR. 3, 1906.
J. MOREHEAD.
GOVERNOR FOR STEAM SYSTEMS AND METER THEREFOR.
APPLICATION FILED MAY 26, 1905.
3 SHEETS—SHEET 2.
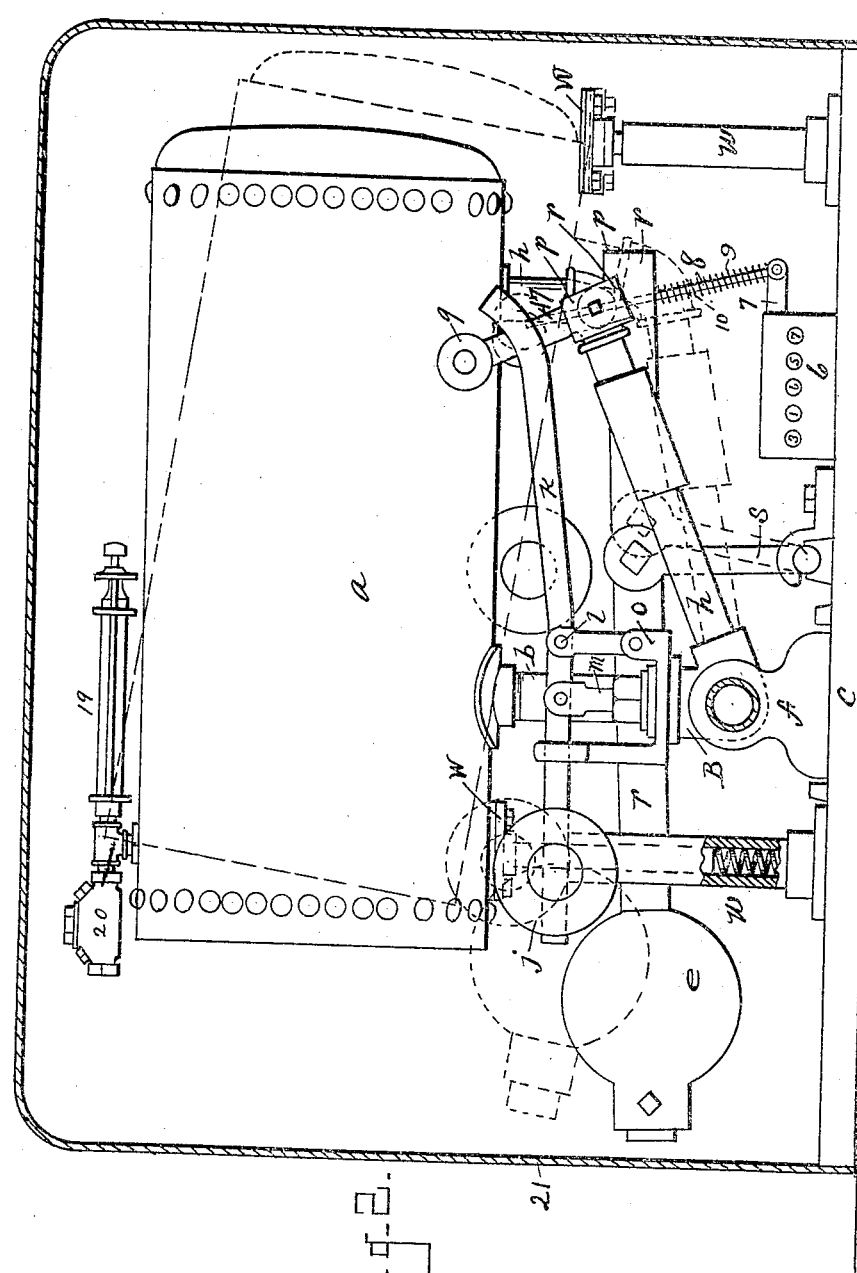

No. 816,589. PATENTED APR. 3, 1906.
J. MOREHEAD.
GOVERNOR FOR STEAM SYSTEMS AND METER THEREFOR.
APPLICATION FILED MAY 26, 1905.
3 SHEETS—SHEET 3.
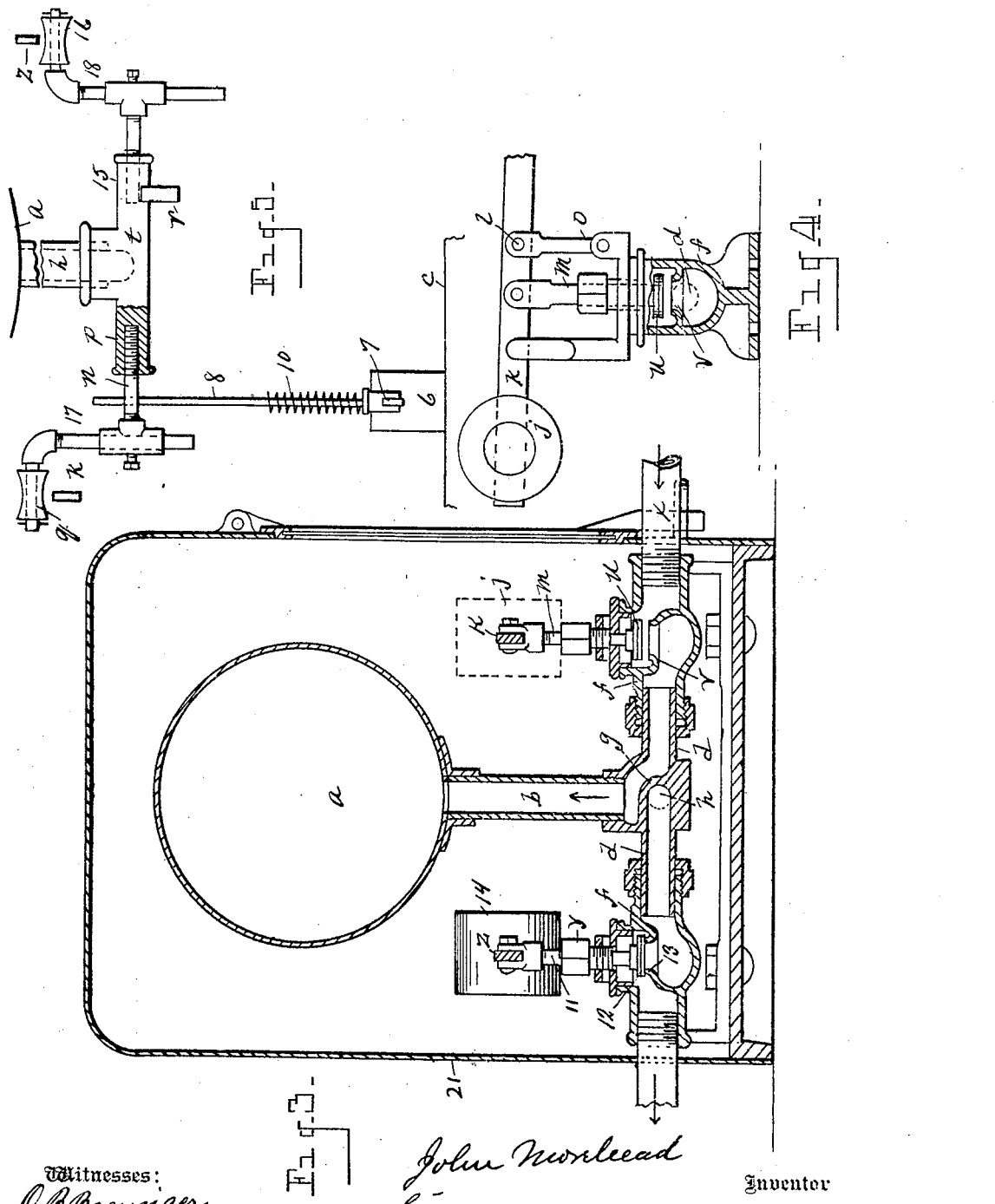
Witnesses:
O. B. Baenziger.
E. L. Schwartz.
John Morehead
Inventor
By his Attorney
Newell S. Wright.

UNITED STATES PATENT OFFICE.

JOHN MOREHEAD, OF DETROIT, MICHIGAN, ASSIGNOR TO DAVID STOTT, OF DETROIT, MICHIGAN.

GOVERNOR FOR STEAM SYSTEMS AND METER THEREFOR.

No. 816,589.   Specification of Letters Patent.   Patented April 3, 1906.

Application filed May 26, 1905. Serial No. 262,338.

*To all whom it may concern:*

Be it known that I, JOHN MOREHEAD, a citizen of the United States, residing at Detroit, county of Wayne, State of Michigan, have invented a certain new and useful Improvement in Governors for Steam Systems and Meters Therefor, of which the following is a specification, reference being had to the accompanying drawings, which form a part of this specification.

My invention has for its object certain new and useful improvements in a governor for a steam system and a water-meter therefor, illustrated in the accompanying drawings and embodied in the following description and claims.

In the drawings, Figure 1 is a view, in side elevation, illustrating features of my invention. Fig. 2 is also a side elevation viewed from the opposite side of the device, the normal position of the tank being shown in full lines, the dotted lines showing the position of the tank when the water is being discharged therefrom. Fig. 3 is a view, in vertical cross-section, on the line 3 3, Fig. 1. Fig. 4 is a detail view showing certain features of the valve mechanism. Fig. 5 is an end elevation showing certain features of the mechanism, one end of the pipe-fitting or elbow being in section.

More particularly my invention is designed to provide a governor for steam-heating appliances or systems and a meter therefor wherein water of condensation is collected in a suitable tank or receiving-chamber, said chamber at suitable intervals freeing itself automatically from the water of condensation contained therein, the operation being registered by a suitable registering device, the inflow of water of condensation into the tank being cut off while the tank is discharging. It is well understood that in steam-heating systems the amount of steam utilized by any given consumer or user is estimated by collecting and measuring the water of condensation. My invention to this end contemplates returning the water of condensation to a suitable tilting receiving chamber or tank, which when a certain amount of water has collected therein will tilt and discharge, at the same time registering the discharge by suitable registering mechanism actuated by the tilting of the tank.

The apparatus embodied in my invention is provided with a suitable valve mechanism to govern the discharge of water from the tank and also a suitable valve mechanism to govern and prevent the inflow of water to the tank while in the act of discharging.

I carry out my invention as follows:

In the drawings, $a$ represents a suitable tilting tank or receiving-chamber, the same being preferably constructed of boiler-iron and of elongated form, the said tank being supported upon an inflow-pipe $b$ at one side of its center of gravity. Any suitable supporting-base may be provided, (indicated at $c$.) A horizontal pipe and fitings are indicated at $d$, from which the pipe $b$ rises, said horizontal pipe also serving as trunnions, upon which the tank may tilt when the weight of the water of condensation in the receiving-chamber overcomes the normal center of gravity, the center of gravity being preferably governed by an adjustable weight $e$, arranged, as hereinafter described, to keep the tank normally in horizontal position to receive the water of condensation until a certain amount of water has accumulated within the chamber. The pipe $d$ is mounted upon bearings $ff$, there being the usual slip-joint connection between the pipe $d$ and the bearings therefor. Within the pipe $d$ is a diaphragm or partition (indicated at $g$) dividing the interior of said pipe, so that one end of said pipe will serve as an inlet communicating with the receiving-chamber. A pipe $h$ leads from the pipe $d$ to the under side of the tank, preferably toward one end thereof, to discharge the water of condensation from the tank when the tank is tilted.

An inlet-valve-controlling mechanism controls the return of water from the radiators through a return-pipe $x$, connected with one of the bearings $f$ and communicable with the tank by way of the pipes $d$ and $h$. This controlling mechanism is shown provided with a valve $u$, seated on a valve-seat $v$ in the adjacent bearing $f$. This valve is held normally open in any suitable manner, as by means of a lever-arm $k$, fulcrumed, as at $l$, upon a suitable support $o$ and connected with the stem $m$ of the valve $u$. An arm $n$ is secured to a projecting lug or elbow $p$ on a pipe-fitting $t$ in the pipe $h$. A friction-roll $q$ is carried by support 17, adjustably engaged upon the arm $n$, as shown, to move the lever $k$ when the tank dumps, said lever being provided with a weight $j$ to overcome any friction in the normal seating of the valve. When the tank tilts, the roll striking said lever $k$ closes the valve $u$ and cuts off any entrance of water into the tank until it is restored to normal position by the weight $e$. The lever $k$ may be given more or less movement, as required, by the vertical adjustment of said roll in the arm $n$. A lever $r$ is preferably employed provided with the weight $e$ to counterbalance the tank, said lever being fulcrumed upon a link $s$ and supported on the base $c$, the end thereof opposite the weight being preferably extended beneath one of the arms or elbows $p$. The action of this weighted lever $r$ supports the tank in a horizontal position until the center of gravity is overcome by the weight of the water in the receiving-chamber of the tank. Suitable buffers $w$ $w$ are arranged to receive the impact of and to support the tank at the limit of its movement. To govern the discharge of water from the tank, an additional valve mechanism is employed, preferably located on the opposite side of the tank, which may be of similar construction to that of the valve mechanism already described, to control the inlet-channel. Such additional valve mechanism is indicated at $y$, actuated by a lever-arm $z$, supported in a similar manner to the lever $k$ and actuating the stem 11 of a valve 12, seating upon a seat 13 in the opposite bearing $f$ to actuate the lever $z$. The fitting $t$ is provided with an additional lug or elbow 15, upon which is adjustably supported an additional friction-roll 16, as by an intervening support 18. In this case the lever $z$ rides upon the roll 16, so that the levers $k$ and $z$ are actuated upon the tilting of the tank in opposite directions. In this manner it will be seen when the valve $u$ is open to admit water into the tank the valve 12 is closed, and vice versa. When the valve $u$ is closed, the valve 12 is open. The tank may be located at any proper and convenient point. The water of condensation is conducted by a suitable return-pipe $x$ to the tank through the pipes $d$ and $b$, as already described. When the volume of water in the receiving-chamber has accumulated sufficiently to overcome the center of gravity, the tank tilts, coming in contact with the buffer $w$. The action of tilting causes the water in the end of the chamber nearest the adjustable weight $e$ to rush to the opposite end of the chamber, thereby assisting in maintaining the tank in tilted position until relieved of the water contained therein. The water in the tank then passes out of the receiving-chamber by way of the pipes $h$ and $d$. When the receiving-chamber is sufficiently free from the water of condensation, the action of the weight $e$ will return the tank to normal position, its reverse movement permitting the valve $u$ to be opened and the valve 12 to be closed, as set forth.

To register the operations of the device, any suitable or ordinary registering mechanism may be employed, (indicated by the numeral 6,) said registering mechanism being provided with an actuating-lever 7, with which is suitably connected an arm 8, passed through the arm $n$. The arm 8 is preferably provided with a spring 10, upon which the arm $n$ contacts when the tank dumps, to actuate lever 7, the spring serving to relieve the pressure upon the lever 7 when the tank tilts below a point sufficient to actuate the registering-lever 7.

Upon the tank I mount a suitable air-inlet check-valve (indicated at 20) of common construction arranged to be automatically opened, as by suction, when the tank tilts to allow atmospheric pressure to enter the tank to facilitate the discharge of water therefrom. The tank is also provided with a suitable automatic air-escape valve,(indicated at 19.) When the tank resumes its normal position, pressure within the tank will close the check-valve. The valve 19 may be in the nature of an ordinary expansion-valve, which will be open when contracted and closed when expanded by heat.

I prefer to cover the mechanism of the device with a suitable case 10, a portion of the case being removed in Figs. 1, 2, and 3 to disclose the mechanism therewithin.

I claim—

1. The combination of a tilting receiving-chamber, a transverse rocking pipe below said chamber, and communicating therewith upon which said chamber is mounted to admit water into said chamber and to discharge water therefrom, a counterbalance-weight to hold the receiving-chamber in normal position until the weight of the water therein causes the tilting of said chamber, a return-pipe communicable with said chamber, valve mechanism to control the communication of said return-pipe with said chamber, and a registering device exterior to the receiving-chamber, said pipe serving as trunnions upon which the tank may tilt, said valve mechanism and said registering mechanism simultaneously actuated by the tilting of said chamber.

2. The combination of a tilting receiving-chamber, a transverse rocking pipe upon which said chamber is mounted, a counterbalance-weight to hold the receiving-chamber in normal position until the weight of the water therein causes the tilting of said chamber, a return-pipe communicable with said chamber through which water of condensation enters into said chamber, valve mechanism on one side of the receiving-chamber to control the admission of water through the return-pipe into said chamber, an outlet-pipe communicable with said chamber, valve mechanism on the opposite side of the receiving-chamber to control the communication of the outlet-pipe with said chamber, and a registering device, said valve mechanism and said registering device actuated by the tilting of said chamber, one of said valve mechanisms being opened when the other is closed.

3. The combination of a tilting receiving-chamber, mechanism to admit water into said chamber and to permit discharge of water therefrom, valve mechanisms to control the admission of water into the chamber additional valve mechanism to control the discharge of water therefrom, means to hold the receiving-chamber in normal position until the weight of water therein causes the tilting of said chamber, and a registering device actuated by the tilting of said chamber, said valve mechanisms also actuated by the tilting of said chamber, one of said valve mechanisms being opened when the other is closed.

4. The combination of a tilting water-receiving chamber means to hold said chamber in normal position until the weight of water therein causes the tilting of said chamber, an inlet-channel communicable with said chamber, valve mechanism arranged to be normally open to control said channel, an outlet-channel communicable with said chamber, and valve mechanism normally closed to control communication of the outlet-channel of the chamber, the valve mechanism controlling the inlet-channel arranged to be closed by the tilting of the chamber, and the valve mechanism controlling the outlet-channel arranged to be simultaneously opened by the tilting of the chamber.

5. The combination of a tilting water-receiving chamber means to hold said chamber in normal position until the weight of water therein causes the tilting of said chamber, an inlet-channel communicable with said chamber, valve mechanism arranged to be normally open to control said channel, an outlet-channel communicable with said chamber, and valve mechanism normally closed to control communication of the outlet-channel of the chamber the valve mechanism controlling the inlet-channel arranged to be closed by the tilting of the chamber, and the valve mechanism controlling the outlet-channel arranged to be simultaneously opened by the tilting of the chamber, said receiving-chamber provided with an air-inlet valve and with an air-outlet valve.

6. The combination of a tilting water-receiving chamber means to hold said chamber in normal position until the weight of the water therein causes the tilting of said chamber, an inlet-channel communicable with said chamber, valve mechanism arranged to be normally open to control said channel, an outlet-channel communicable with said chamber, and valve mechanism normally closed to control communication of the outlet-channel of the chamber, the valve mechanism controlling the inlet-channel arranged to be closed and the other valve mechanism arranged to be simultaneously opened by the tilting of the chamber, and a registering device simultaneously actuated by the tilting of the chamber.

7. The combination of a tilting receiving-chamber, a transverse rocking pipe communicating with said chamber upon which said chamber is mounted, means to hold the receiving-chamber in normal position until the weight of the water therein causes said chamber to tilt, a return-pipe communicating with said transverse pipe, valve mechanism to control communication through the return-pipe, an outlet-pipe communicating with said transverse pipe, valve mechanism to control the discharge through the outlet-pipe and a registering device, said valve mechanisms and said registering device actuated by the tilting of said chamber to register the number of times the receiving-chamber tilts.

In testimony whereof I have signed this specification in the presence of two subscribing witnesses.

JOHN MOREHEAD.

Witnesses:
  N. S. WRIGHT,
  ELVA L. SCHWARTZ.